UNITED STATES PATENT OFFICE 2,560,350

2,2-BIS-(PARA-ALLYLOXYPHENYL) PROPANE MITICIDAL COMPOSITIONS

Arthur G. Jelinek, Wilmington, Del., assignor to E. I. du Pont de Nemours & Company, Wilmington, Del., a corporation of Delaware No Drawing. Application April 26, 1948, Serial No. 23,410

1 Claim. (Cl. 167—30)

This invention relates to the compound 2,2-bis(para-allyloxyphenyl)propane and to miticidal, or mite killing, compositions and methods employing the compound.

2,2-bis(para-allyloxyphenyl)propane is represented by the formula

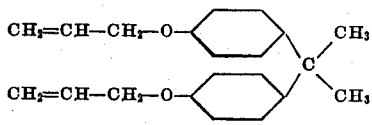

The compound is a light yellow-colored oily liquid having a refractive index $n_D^{25}=1.563$ and a density $d_4^{25}=1.043$. It is soluble in acetone and ether, slightly soluble in alcohol and insoluble in water.

2,2-bis(para-allyloxyphenyl)propane is prepared by heating together 4,4'-isopropylidenediphenol and an allyl halide such as allyl bromide. The reaction is suitably carried out in the presence of a diluent solvent such as acetone and in the presence of an HCl acceptor such as potassium carbonate.

The compound of the invention, 2,2-bis(para-allyloxyphenyl)propane, is usually effective in the control of mites. It not only kills the adult mites but also kills their eggs. Applications of the compound exhibit considerable residual action.

The compound of the invention in admixture with the conventional insecticidal adjuvants may be applied safely to growing crops and is particularly useful in the treatment of fruit orchards because it does not leave a dull residue on fruit. The compound has the additional advantage of being compatible with sulfur and other fungicides and insecticides which are commonly used in the treatment of fruit trees.

The compound of the invention is admixed with suitable insecticidal adjuvants to provide miticidal compositions of the invention in the form of solutions, dust compositions, water-dispersible powders, and aqueous dispersions or emulsions.

By the term "insecticidal adjuvant" I mean a substance which is capable of presenting or aiding in the presentation of a toxicant to insects, mites and similar pests. The term "adjuvant" is well established in the art where it is recognized that an active agent or toxicant is in itself of little practical utility for combatting insects and like pests unless it be presented in a form suitable for effecting intimate contact of the agent or its vapors, as the particular case may require, with the pest. Thus additional material or materials are employed in the formulation of an active agent to yield a suitable insecticidal or miticidal composition, such materials being adjuvants.

The adjuvants such as the dusts, solvents, and wetting, dispersing and emulsifying agents set out in U. S. Patent 2,426,417 may be employed in the preparation of the miticidal compositions of the present invention. Still other wetting, dispersing and emulsifying agents are listed in detail in Bulletin E-607 of the Bureau of Entomology and Plant Quarantine of the U. S. Dept. of Agriculture and in an article by McCutcheon in Chemical Industries, November 1947, page 811 entitled "Synthetic Detergents."

Preferably the compositions of the invention are in the form of "concentrates" suitable for dispersion in water to give aqueous spray compositions. A suitable liquid concentrate is obtained, for example, by adding a dispersing or emulsifying agent to the compound, 2,2-bis(para-allyloxyphenyl)propane. Preferably the dispersing or emulsifying agent is one which is soluble in the compound and ordinarily the agent will not comprise more than 10% by weight of the composition and with the better adjuvant materials, the percentage will be 5% or less.

More dilute liquid concentrates are obtained by dissolving the compound of the invention in a suitable solvent. In such case, the concentration of the toxicant in solvents may be varied widely according to the solubility of the toxicant in the particular solvent selected.

Dust compositions are obtained by adsorbing 2,2-bis(para-allyloxyphenyl)propane on a finely-divided powder. The maximum concentration of the toxicant in such powdered compositions will, of course, vary with the adsorptivity of the particular powdered diluent used. The powdered compositions are made water-dispersible by addition of an effective amount of one of the conventional dispersing agents such as Goulac.

In actual application of the compositions of the invention to vegetation or agricultural crops, it is preferred to dilute the concentrates, preferably by dispersion in water, to obtain aqueous suspensions or emulsions.

In applying the compound of the invention to an area or locus to be protected from mite infestation, the compound is applied in amount sufficient to exert a miticidal action. Normally a composition containing from about 0.1 to about 1% of the toxic compound is adequate for this purpose and more preferably, if the treatment is made by spraying an aqueous emulsion, the concentration of the toxicant in the spray composition is from about 0.1 to 0.2% by weight. The application may be made directly to a mite infested area or locus or, alternatively, it may be made in advance of an anticipated infestation by mites.

The compositions of the invention may include fungicides such as sulfur, zinc dimethyl dithiocarbamate, zinc ethylene bis-dithiocarbamate, and manganese ethylene bis-dithiocarbamate; insecticides such as DDT, 2,2-bis(para-methoxyphenyl) - 1,1,1 - trichloroethane (methoxychlor), and 1,2,4,5,6,7,8,8 - octachloro - 4,7 - methane-3a,4,7,7a - tetrahydroindane (chlordane); and other fungicides and insecticides such as those set out in U. S. Patent 2,426,417.

The invention is illustrated by the following examples:

Example I 2,2-bis(para-allyloxyphenyl)propane was prepared by bringing together 894 grams of 4,4'-isopropylidenediphenol and 1055 grams of allyl bromide in 1600 cc. of acetone. 1120 grams of anhydrous potassium carbonate was added to this mixture to serve as a HCl acceptor. The mixture was then heated at reflux temperature under atmospheric pressure for 9 hours. At the end of the heating period, the acetone was distilled off and the remaining mass was diluted with an equal volume of water. An only layer separated and this was thoroughly agitated with 300 cc. of 10% sodium hydroxide solution to remove unreacted 4,4'-isopropylidenediphenol from the product layer. The remaining organic layer was separated and the caustic wash was repeated. After separating the organic layer from the caustic aqueous liquid, the organic liquid was then washed three times with ethanol. The product layer was then separated from the alcohol and heated under vacuum at about 100° C. to remove traces of alcohol which remained.

This process yielded 595 grams of the product, 2,2-bis(para-allyloxyphenyl)propane. The product was a clear, light yellow, oily liquid. $n_D^{25}=1.5632$; $d_4^{25}=1.043$. Analysis: C theory 81.8%, found 81.73%; H theory 7.8%, found 7.90%.

Example II 2,2-bis(para-allyloxyphenyl)propane prepared according to the process of Example I is admixed with the emulsifying agent, diethylcyclohexylamine dodecyl sulfate, to give a composition containing 95% by weight of the compound of the invention and 5% by weight of the emulsifying agent.

The composition of this example is a water-dispersible, miticidal concentrate. The composition is readily dispersible in water to provide aqueous spray compositions of suitable concentration. A spray composition well suited for the control of mites is obtained by dispersing a pint of the above composition in 100 gallons of water.

Illustrations of the important species of mites which attack crops and against which the composition of Example II and the other compositions of this invention are suitably applied are: two-spotted mite, citrus red mite, apple bud mite, cyclamen mite, apple red spider, European red mite, common red spider, blackberry mite, Pacific mite, citrus rust mite, pear leaf blister mite, Pacific-spotted mite, and Willamette mite.

Example III

A water-dispersible powder or dust composition of the invention is prepared by mixing the ingredients tabulated below to obtain a finely-divided solid:

5% 2,2-bis(para-allyloxyphenyl)propane
80% fuller's earth (average particle size less than 40 microns)
5% Goulac The composition of this example is applied as a dust or more preferably by dispersing it in water to form an aqueous suspension for application as a spray for the control of mites and their eggs.

I claim:

A miticidal composition comprising 2,2-bis-(para-allyloxyphenyl)propane in amount sufficient to exert a miticidal action in admixture with an emulsifying agent.

ARTHUR G. JELINEK.

REFERENCES CITED

The following references are of record in the file of this patent:

Busvine: J. Soc. of Chem. Ind., November 1946, pages 356–360 (5 sheets).

Yohe et al.: J. Am. Chem. Soc. 57, 2259–60 (1935).

Certificate of Correction

Patent No. 2,560,350 July 10, 1951

ARTHUR G. JELINEK

It is hereby certified that error appears in the printed specification of the above numbered patent requiring correction as follows:

Column 1, line 26, for "usually" read *unusually*; column 3, line 31, for "only" read *oily*;

and that the said Letters Patent should be read as corrected above, so that the same may conform to the record of the case in the Patent Office.

Signed and sealed this 20th day of November, A. D. 1951.

[SEAL]

THOMAS F. MURPHY,
*Assistant Commissioner of Patents.*